(12) United States Patent
Opalka et al.

(10) Patent No.: US 10,865,841 B2
(45) Date of Patent: Dec. 15, 2020

(54) COMPOSITE BRAKE DISKS WITH AN INTEGRATED HEAT SINK, METHODS FOR MANUFACTURING THE SAME, AND METHODS FOR PRODUCING ENCAPSULATED HEAT SINK MATERIAL

(71) Applicant: Goodrich Corporation, Charlotte, NC (US)

(72) Inventors: Susanne M. Opalka, Glastonbury, CT (US); Georgios S. Zafiris, Glastonbury, CT (US); Weina Li, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 135 days.

(21) Appl. No.: 16/262,576

(22) Filed: Jan. 30, 2019

(65) Prior Publication Data
US 2019/0162263 A1    May 30, 2019

Related U.S. Application Data

(62) Division of application No. 14/877,701, filed on Oct. 7, 2015, now Pat. No. 10,253,832.

(51) Int. Cl.
*C04B 35/622* (2006.01)
*C04B 35/80* (2006.01)
(Continued)

(52) U.S. Cl.
CPC ...... *F16D 65/128* (2013.01); *C04B 35/62227* (2013.01); *C04B 35/80* (2013.01);
(Continued)

(58) Field of Classification Search
CPC .................................................. F16F 65/128
See application file for complete search history.

(56) References Cited

U.S. PATENT DOCUMENTS 5,370,814 A    12/1994 Salyer
5,477,917 A    12/1995 Salyer
(Continued)

FOREIGN PATENT DOCUMENTS

EP    2775161    9/2014
GB    2285104    7/1998
(Continued)

OTHER PUBLICATIONS

Science China Technological Services, Densification and microstructure of carbon/carbon composites prepared by chemical vapor infiltration using ethanol as precursor, Li Wei Zhang Shou Yang, Yan XiaFeng, Li Hejun & Li KeZhi Aug. 2010; 2 pages.
(Continued)

*Primary Examiner* — Robert A Vetere
(74) *Attorney, Agent, or Firm* — Snell & Wilmer L.L.P.

(57) ABSTRACT

Brake disks with integrated heat sink are provided. Brake disk includes a fiber-reinforced composite material and an encapsulated heat sink material impregnated into the fiber-reinforced composite material. The encapsulated heat sink material comprises a heat sink material encapsulated within a silicon-containing encapsulation layer. Methods for manufacturing the brake disk with integrated heat sink and methods for producing the encapsulated heat sink material are also provided.

11 Claims, 2 Drawing Sheets

(51) Int. Cl.
| | |
|---|---|
| *C04B 35/83* | (2006.01) |
| *C04B 35/573* | (2006.01) |
| *F16D 65/12* | (2006.01) |
| *F16D 69/02* | (2006.01) |
| *C04B 41/85* | (2006.01) |
| *C04B 41/00* | (2006.01) |
| *C04B 41/50* | (2006.01) |
| *C04B 41/51* | (2006.01) |
| *C04B 111/00* | (2006.01) |

(52) U.S. Cl.
CPC ............ *C04B 35/806* (2013.01); *C04B 35/83* (2013.01); *C04B 41/009* (2013.01); *C04B 41/501* (2013.01); *C04B 41/5012* (2013.01); *C04B 41/5155* (2013.01); *C04B 41/85* (2013.01); *F16D 65/126* (2013.01); *F16D 69/023* (2013.01); *C04B 35/573* (2013.01); *C04B 2111/00362* (2013.01); *C04B 2111/00982* (2013.01); *C04B 2235/3203* (2013.01); *C04B 2235/3206* (2013.01); *C04B 2235/3217* (2013.01); *C04B 2235/3244* (2013.01); *C04B 2235/3418* (2013.01); *C04B 2235/386* (2013.01); *C04B 2235/3813* (2013.01); *C04B 2235/3817* (2013.01); *C04B 2235/3821* (2013.01); *C04B 2235/3826* (2013.01); *C04B 2235/3843* (2013.01); *C04B 2235/3873* (2013.01); *C04B 2235/3891* (2013.01); *C04B 2235/40* (2013.01); *C04B 2235/401* (2013.01); *C04B 2235/402* (2013.01); *C04B 2235/407* (2013.01); *C04B 2235/443* (2013.01); *C04B 2235/444* (2013.01); *C04B 2235/5208* (2013.01); *C04B 2235/5224* (2013.01); *C04B 2235/5228* (2013.01); *C04B 2235/5244* (2013.01); *C04B 2235/5248* (2013.01); *C04B 2235/614* (2013.01); *C04B 2235/616* (2013.01); *C04B 2235/77* (2013.01); *C04B 2235/80* (2013.01); *C04B 2235/9607* (2013.01); *F16D 2200/0065* (2013.01); *F16D 2200/0082* (2013.01)

(56) References Cited

U.S. PATENT DOCUMENTS

| | | |
|---|---|---|
| 5,613,578 A | 3/1997 | Moseley et al. |
| 6,221,475 B1 | 4/2001 | Domergue et al. |
| 6,668,984 B2 | 12/2003 | Gray |
| 6,855,428 B2 | 2/2005 | Lau et al. |
| 6,988,304 B2* | 1/2006 | Moseley ............... C04B 35/83 29/458 |
| 7,419,700 B2 | 9/2008 | Guther et al. |
| 2001/0007296 A1 | 7/2001 | Roloff |
| 2004/0081859 A1 | 4/2004 | McElroy |
| 2004/0186540 A1 | 9/2004 | Agarwal |
| 2004/0192534 A1 | 9/2004 | Nixxon et al. |
| 2008/0145588 A1* | 6/2008 | Kasperchik ......... C09D 11/037 428/65.2 |
| 2010/0331166 A1 | 12/2010 | Hidaka et al. |
| 2011/0200819 A1 | 8/2011 | Baba et al. |
| 2014/0197355 A1* | 7/2014 | Ram ...................... C08K 3/16 252/75 |

FOREIGN PATENT DOCUMENTS

| | | |
|---|---|---|
| WO | 2001096061 | 12/2001 |
| WO | 0228801 | 4/2002 |

OTHER PUBLICATIONS

Extended European Search Report dated May 9, 2017 in European Application No. 16192652.2.
Communication Pursuant to Article 94(3) EPC dated Jan. 16, 2018 in European Application No. 16192652.2.
USPTO; Restriction Requirement Office Action dated Jan. 13, 2017 in U.S. Appl. No. 14/877,701.
USPTO; Pre-Interview First Office Action dated May 8, 2017 in U.S. Appl. No. 14/877,701.
USPTO; First Action Interview Office Action dated Jun. 26, 2017 in U.S. Appl. No. 14/877,701.
USPTO; Final Office Action dated Nov. 28, 2017 in U.S. Appl. No. 14/877,701.
USPTO; Advisory Action dated Feb. 6, 2018 in U.S. Appl. No. 14/877,701.
USPTO; Non-Final Office Action dated Mar. 19, 2018 in U.S. Appl. No. 14/877,701.
USPTO; Final Office Action dated Jul. 6, 2018 in U.S. Appl. No. 14/877,701.
USPTO; Advisory Action dated Sep. 13, 2018 in U.S. Appl. No. 14/877,701.
USPTO; Notice of Allowance dated Nov. 23, 2018 in U.S. Appl. No. 14/877,701.

* cited by examiner

COMPOSITE BRAKE DISKS WITH AN INTEGRATED HEAT SINK, METHODS FOR MANUFACTURING THE SAME, AND METHODS FOR PRODUCING ENCAPSULATED HEAT SINK MATERIAL

CROSS-REFERENCE TO RELATED APPLICATIONS

This application is a divisional of, and claims priority to, U.S. application Ser. No. 14/877,701, filed Oct. 7, 2015 and entitled "COMPOSITE BRAKE DISKS WITH AN INTEGRATED HEAT SINK, METHODS FOR MANUFACTURING THE SAME, AND METHODS FOR PRODUCING ENCAPSULATED HEAT SINK MATERIAL," which is hereby incorporated by reference in its entirety.

FIELD

The present disclosure relates to aircraft braking systems and, more particularly, to brake disks with an integrated heat sink, methods for manufacturing the same, and methods for producing encapsulated heat sink material.

BACKGROUND

Aircraft brake systems typically employ a series of brake disks that, when forced into contact with each other, help to stop the aircraft. The brake disks may be configured of a carbon fiber-reinforced/carbon matrix (C/C) composite material to help withstand and dissipate the heat generated from contact between the brake disks during braking. However, the brake disks are exposed to large temperature excursions and extreme environmental conditions. During brake engagement, the brake disks can heat up to about 1100° C. (about 2000° F.), or higher. The brake disks should cool down prior to the next flight to enable stowing of the landing gear, potentially delaying take-offs. On the other hand, it may be beneficial to heat the brake disks up prior to take-off if the brakes have cooled down to ambient conditions, such as the case when the aircraft is grounded for awhile. In addition, carbon fiber-reinforced/carbon matrix (C/C) composite brake disks are susceptible to oxidation starting at relatively low temperatures (e.g., about 350° C. to about 400° C.), gasifying the carbon to $CO_2$, and deicing salts can attack the intrinsically porous brake disks causing material degradation. These conditions can be enough to compromise the performance, reliability, integrity, and life of conventional carbon fiber-reinforced/carbon matrix (C/C) composite brake disks.

SUMMARY

Brake disks with an integrated heat sink are provided, according to various embodiments. The brake disk includes a fiber-reinforced composite material and an encapsulated heat sink material impregnated into the fiber-reinforced composite material. The encapsulated heat sink material comprises a heat sink material encapsulated within a silicon-containing encapsulation layer.

Methods are provided for producing encapsulated heat sink material, according to various embodiments. The method comprises dispersing particles of a heat sink material in a solvent containing a surfactant to form a dispersion. An organic silicon precursor is added to the dispersion. A silicon-containing encapsulation layer around the heat sink material is formed from the organic silicon precursor.

Methods are provided for manufacturing a brake disk with an integrated heat sink, according to various embodiments. The method comprises infiltrating the brake disk or preform thereof with an encapsulated heat sink material in a solvent. The encapsulated heat sink material comprises a heat sink material encapsulated within a silicon-containing encapsulation layer. The solvent is removed.

In any of the foregoing embodiments, the fiber-reinforced composite material comprises at least one of a fiber-reinforced/carbon matrix composite or a ceramic matrix composite material. A fiber of the fiber-reinforced composite material comprises at least one of a carbon fiber, a silicon carbide fiber, an alumina fiber, an aluminosilicate fiber, or a glass fiber. The fiber-reinforced/carbon matrix composite material comprises a carbon fiber-reinforced/carbon (C/C) matrix composite material if the fiber comprises the carbon fiber. The ceramic matrix composite material comprises at least one of a boride, a carbide, a nitride, an oxide, or a silicide. The boride comprises at least one of $SiB_2$, $SiB_6$, $TiB_2$, or $ZrB_2$, the carbide comprises at least one of SiC, $B_4C$, HfC, TiC, or ZrC, the nitride comprises at least one of BN or $Si_3N_4$, the oxide comprises at least one of $Al_2O_3$, $ZrO_2$, or $SiO_2$, and the silicide comprises at least one of $TiSi_2$ or $MoSi_2$. The heat sink material comprises at least one of an eutectic salt, a eutectic alloy, or a material with a melting temperature greater than about 300° C. and less than about 1100° C., a transition temperature greater than about 300° C. and less than about 1100° C., and a density of less than 3.5 g/cm³. The silicon-containing encapsulation layer comprises at least one of a silicon dioxide ($SiO_2$) or silicon carbide (SiC). The surfactant comprises at least one of polyvinylpyrrolidone (PVP) polymer, polyvinylalcohol (PVA), polyethylene oxide (PEO), polypropylene oxide (PPO), or acetylenic diol based chemicals. The solvent comprises at least one of ethanol, 1-propanol, 2-propanol, 1-butanol, or 2-butanol. The organic silicon precursor comprises tetraethoxy silane $Si(OC_2H_5)_4$ and the silicon-containing encapsulation layer comprises $SiO_2$. The organic silicon precursor comprises a polycarbosilane and the silicon-containing encapsulation layer comprises SiC. Forming the silicon-containing encapsulation layer comprises decomposing the organic silicon precursor by at least one of a heat treatment or a condensation reaction. Converting the silicon dioxide encapsulation layer into a silicon carbide encapsulation layer comprises carburizing the silicon dioxide encapsulation layer. Forming the silicon-containing encapsulation layer is performed prior to infiltrating or after infiltrating and removing. Forming and carburizing are performed simultaneously.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Various embodiments are directed to brake disks with an integrated heat sink, methods for manufacturing the same, and methods for producing an encapsulated heat sink material. Carbon fiber-reinforced/carbon matrix (C/C) composite brake disks with an integrated heat sink have improved thermal performance and extended life, which tend to enable reductions in aircraft maintenance and layover times relative to aircraft with conventional carbon fiber-reinforced/carbon matrix (C/C) composite brake disks (i.e., C/C brake disks without an integrated heat sink). Additionally, various embodiments tend to seal the intrinsic porosity of the C/C brake disk and protect it from corrosive attack by deicing salts and decomposition by oxidation. As used herein, the term "about" in regards to temperatures or other properties only means+/−10%.

Figure 1A:
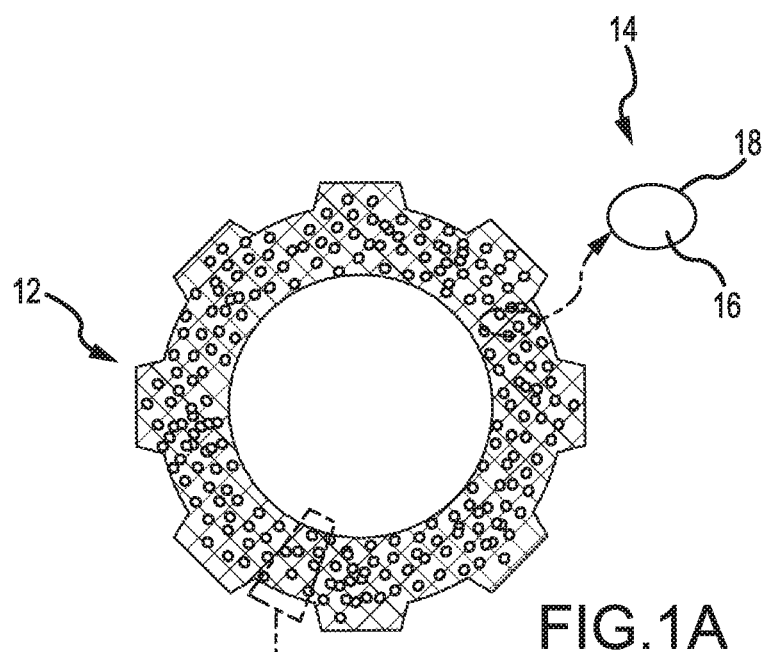
FIG. 1A is a planar view of a brake disk with an integrated heat sink in accordance with various embodiments.
Figure 1B:
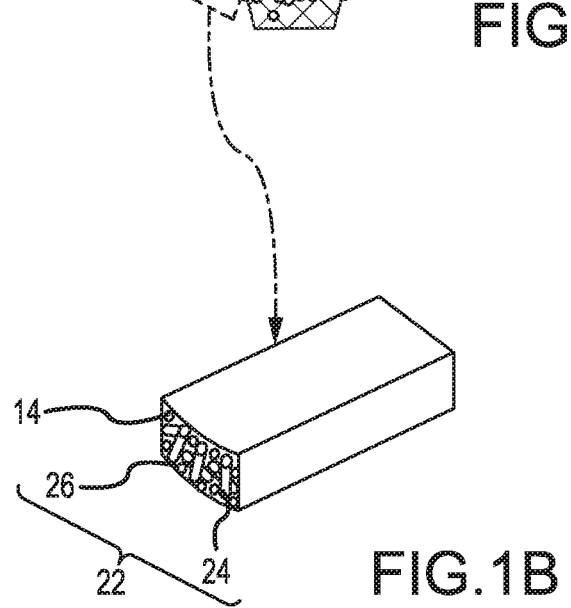
FIG. 1B illustrates a portion of the brake disk with an integrated heat sink of FIG. 1A.
Figure 2:
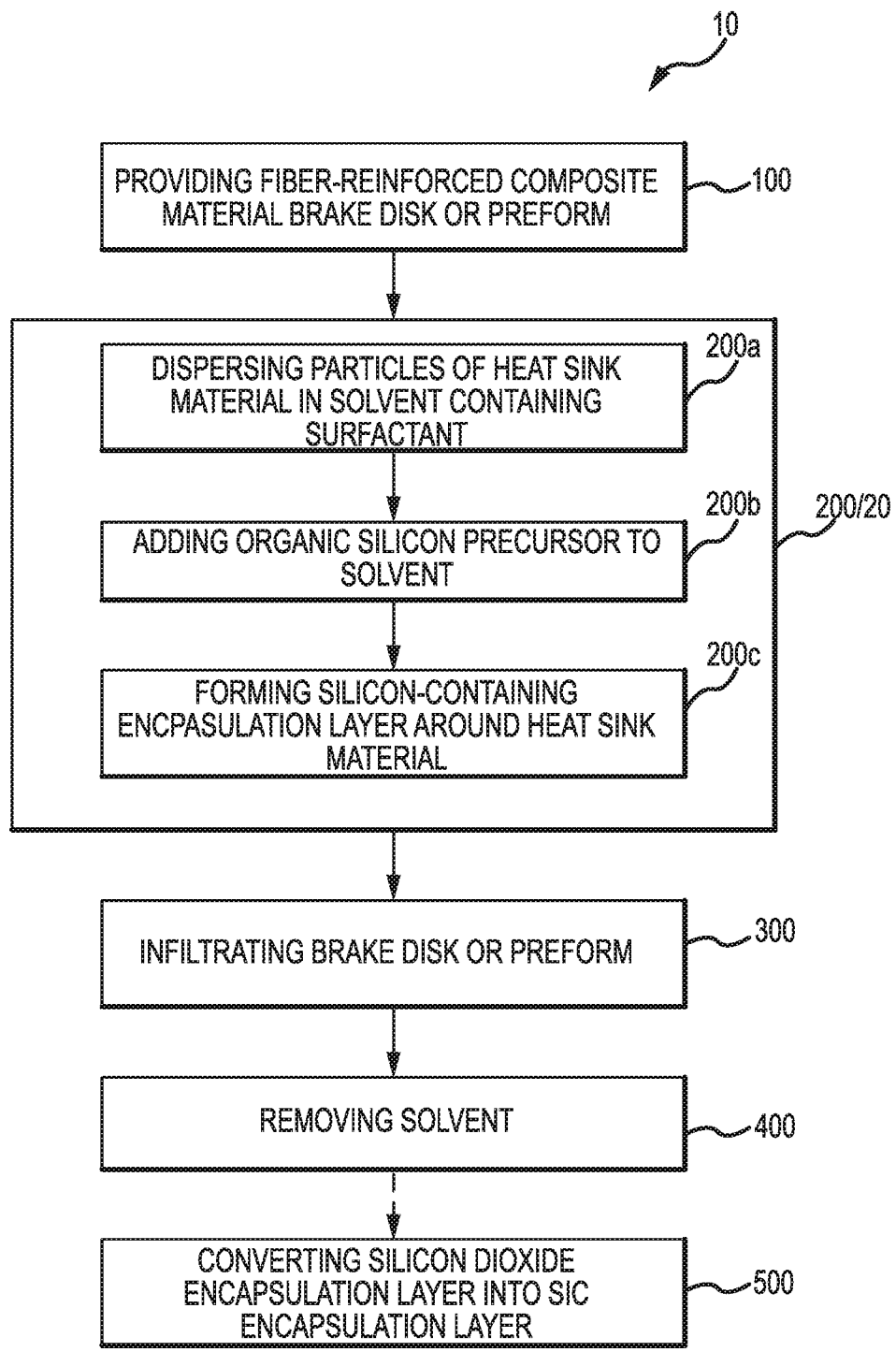
FIG. 2 is a flow diagram of a method for manufacturing a brake disk with an integrated heat sink and including a flow diagram of a method for producing an encapsulated heat sink material comprising the integrated heat sink in accordance with various embodiments.

Referring now to FIGS. 1A, 1B, and 2, according to various embodiments, a method 10 for manufacturing a brake disk with an integrated heat sink 12 begins by providing a fiber-reinforced composite brake disk or preform thereof (step 100). The fiber-reinforced composite brake disk may be commercially available or manufactured from a preform as described herein. The preform may also be commercially available or manufactured as described herein. The (fiber-reinforced composite) brake disk with an integrated heat sink 12 comprises a fiber-reinforced composite material 22 and an encapsulated heat sink material 14 impregnated into the fiber-reinforced composite material 22. The encapsulated heat sink material 14 comprises a heat sink material 16 and an encapsulation layer material 18. The fiber-reinforced composite material 22 of the brake disk comprises reinforcement fibers 24 and a matrix material 26. The fiber-reinforced composite material 22 of the brake disk may be a carbon fiber-reinforced/carbon matrix (C/C) composite material as used in conventional brake disks, a fiber-reinforced/carbon matrix composite material, or a fiber-reinforced/ceramic matrix composite material. Carbon fiber-reinforced/carbon matrix (C/C) is a composite material consisting of carbon fiber reinforcement in a matrix of pyrolytic carbon. Fibers of other materials may also be present. Due to its excellent performance under high temperature (particularly above 2000° C. (3672° F.)), C/C composite materials were developed for aircraft brake disks. The fiber-reinforced composite material brake disk may be intrinsically porous (with a porosity of less than 10% by volume) and a density of 1.5 g/cm$^3$ or higher.

In various embodiments, the C/C brake disk with an integrated heat sink 12 may be manufactured from a preform as known in the art. The carbon preform is made of polyacrylonitrile (PAN) fiber mats or woven fabrics formed to shape in a mold. The preform is subsequently thermally treated to eliminate non-carbon elements and increase the weight percent of carbon therein. Following this thermal treatment, the treated preforms undergo a chemical vapor infiltration (CVI) process, a chemical vapor deposition (CVD) process with a hydrocarbon atmosphere, an impregnation of a carbon-rich material followed by pyrolysis, or other carbonization processes as known in the art to produce the C/C composite material. The simplified carbonization chemical reaction is: $C_xH_y(g) \rightarrow C_x(s) + y/2 H_2(g)$. "Carbonization" is the term for the conversion of an organic substance into carbon or a carbon-containing residue through pyrolysis or destructive distillation. Chemical vapor infiltration (CVI) is the most commonly used process for the production of C/C composite material. The physical properties of the C/C composite material depend on the preform fiber selection and orientation, as well as the CVI, CVD and other process conditions and chemistries involved. Chemical vapor infiltration generally involves flowing one or several streams of precursor hydrocarbon vapors containing the desired elements or compounds, e.g., natural gas, methane, propylene, etc., over and around porous carbon fiber preforms, while keeping the preforms in a reactor at a sufficiently high temperature to decompose the precursor (generally greater than 1000° C. (1832° F.)) and at a pressure of about 1 kPa (7.5 Torr), resulting in a deposition of pyrolytic carbon filling the porous carbon fiber preforms. Under these conditions, the hydrocarbon gases undergo chemical pyrolysis reactions that deposit elemental carbon onto the carbon fibers of the preform to produce the C/C composite material.

While an exemplary brake disk comprising a C/C composite material has been described, it is to be understood as noted above that the brake disk may comprise a fiber-reinforced/carbon matrix composite material or a fiber-reinforced/ceramic matrix composite (CMC) material. The fiber-reinforced/carbon matrix composite material comprises reinforcing fibers 24 of other than carbon embedded in a carbon matrix composite material. Ceramic matrix composite (CMC) materials comprise ceramic fibers embedded in a ceramic matrix, thus forming a ceramic fiber reinforced composite material. For example, reinforcing fibers 24 of the ceramic matrix composite brake disk may include, in addition to or in place of the carbon fibers, ceramic fibers comprising at least one of a silicon carbide fiber, an alumina fiber, an aluminosilicate fiber, or a glass fiber. Exemplary ceramic matrix composite material 26 for the brake disk includes at least one of a carbide (e.g. SiC, $B_4C$, HfC, TiC, ZrC, etc.), a boride (e.g. $SiB_2$, $SiB_6$, $TiB_2$, $ZrB_2$, etc.), a nitride (BN, $Si_3N_4$, etc.), an oxide ($Al_2O_3$, $ZrO_2$, $SiO_2$, etc.), or a silicide (e.g., $TiSi_2$, $MoSi_2$, etc.). The ceramic matrix composite material may be manufactured from a preform as known in the art. The preform for the ceramic matrix composite material may be commercially available or manufactured by methods well known to those skilled in the art. The properties of the fiber-reinforced composite material brake disk may be tailored by using additional or alternative matrix chemistries (e.g. silicon, boron, nitrogen, and/or oxygen based compounds in addition or instead of hydrocarbons) and fiber compositions, coatings and structures.

Still referring to FIGS. 1A, 1B, and 2, the method 10 for manufacturing a brake disk with an integrated heat sink continues by producing the encapsulated heat sink material (step 200). The encapsulated heat-sink material may be produced in sub-steps 200a, 200b, and 200c according to various embodiments as hereinafter described. Sub-steps 200a, 200b, and 200c collectively comprise a method 20 for producing the encapsulated heat sink material as hereinafter described. As noted previously, the encapsulated heat sink material 14 comprises the heat sink material 16 encapsulated within a silicon-containing encapsulation layer 18. The encapsulated heat sink material comprises particles of less than about 10 microns in diameter. The heat sink material comprises one or more high melting temperatures (greater than 300° C. (572° F.) and less than 1100° C. (2012° F.)) eutectic alloys, eutectic salts, and other heat sink materials. Unless otherwise specified, the term "heat sink material" as used herein refers collectively to the high temperature eutectic alloys, eutectic salts, and other heat sink material. The composition of the heat sink material may be tailored to the melt temperatures needed for the required heat sink load and brake disk operating temperature profile. Exemplary heat sink materials (also known as thermal storage materials and phase change materials) may include the following:

Eutectic Salts

| Heat Sink Material (mol %) | $T_{melting}$ (° C.) | $\Delta H_{fusion}$ (kJ/kg) | Density (g/cm$^3$) |
|---|---|---|---|
| 87 LiNCO$_3$—13 NaCl | 208 | 369 | 2.4 |
| 93.6 LiNO$_3$—6.4 NaCl | 255 | 354 | 2.4 |
| 63 LiOH—37 LiCl | 264 | 437 | 1.8 |
| 62 LiOH—36.5 LiCl—1.5 KCl | 282 | 300 | 1.8 |
| 46.6 Li$_2$CO$_3$—53.4 KCO$_3$ | 488 | 391 | 2.2 |
| 33 NaCl—67CaCl$_2$ | 500 | 281 | 2.2 |

$\Delta H_{fusion}$ is also known as the latent heat thermal storage capacity

Eutectic Alloys

| Heat Sink Material (weight %) | $T_{transformation}$ (° C.) | $\Delta H_{fusion}$ (kJ/kg) | Density (g/cm$^3$) |
|---|---|---|---|
| Al/Al$_2$Cu | 548 | 351 | 3.4 |
| Al/Al$_2$Cu/Al$_2$CuMg | 506 | 360 | 3.1 |
| Al/Mg$_5$Al$_8$ | 451 | 310 | 2.3 |

It is to be understood that other heat sink materials may be used if the material has the requisite thermal storage capacity (about 100 to about 1000 kJ/kg) for the application. The heat sink material exchanges heat by undergoing one or more crystal-crystal or crystal-liquid first order transitions with high latent heats at an intermediate temperature (between about 300 to about 600° C. (about 572 to about 1112° F.)) during aircraft brake use. The heat sink material should have reversible first order transitions with sufficiently large latent heats at the temperatures associated with brake thermal management (between about 300 to about 600° C. (about 572 to about 1112° F.)) with a maximum temperature of about 1100° C. (2012° F.). Latent heat refers to the thermal storage capacity ($\Delta H_{fusion}$). There is a range of phase change thermal storage materials that can be used to capture and release heat at the intermediate to high temperatures (about 300 to about 1100° C.) associated with kinetic energy adsorption while preventing brake overheating, while providing thermal stability with respect to decomposition or reactions. These heat sink materials have physical transitions at specific temperatures (or temperature ranges for mixtures) with very large latent heats that can be used to provide a significant increase in heat adsorption capacity, in addition to the sensible heat capacity of the C/C composite brake material. The first order transition temperature for the heat sink material may be greater than about 300° C. (and up to about 1100° C.). The sensible heat capacity of a material is the amount of thermal energy stored in the material upon a given increase of its temperature without undergoing any phase change or first order transitions.

While the use of these encapsulated heat sink materials may impose a weight penalty on the brake disk, the encapsulated heat sink material provides significant overheat protection according to various embodiments. A weight-capacity trade-off analysis may be conducted to determine the optimum loading for the heat sink material. In addition to providing overheat protection, the encapsulated heat sink material may reduce the amount of the fiber-reinforced composite material required for the brake disk. In any case, the additional thermal storage capacity conferred to the brake disk by the encapsulated heat sink material provides an additional measure of overheat protection, while also shortening or eliminating the required wait time before the next take-off.

Still referring to FIG. 2, according to various embodiments, the method 20 for producing an encapsulated heat-sink material is depicted. The method 20 for producing the encapsulated heat sink material comprises dispersing particles of the heat sink material in a polar or non-polar solvent that contains a surfactant (sub-step 200a). The solvent may be used as a dispersing medium. The surfactant is adsorbed onto the surface of the heat sink material particles and it may be used as a coupling or dispersing agent for the particles of the heat sink material dispersed in the solvent. Exemplary surfactants may be at least one of polyvinylpyrrolidone (PVP) polymer, polyvinylalcohol (PVA), polyethylene oxide (PEO), polypropylene oxide (PPO), or acetylenic diol based chemicals, and can be anionic, cationic, or non-ionic surfactants. The choice of the surfactant and the solvent depends upon the solubility of an organic silicon precursor as hereinafter described. Exemplary solvents may be ethanol or other alcohols such as 1-propanol, 2-propanol, 1-butanol, 2-butanol, etc. (e.g., as noted previously, the heat sink material may comprise an eutectic salt, an eutectic alloy, or other heat sink material that has the requisite thermal storage capacity for the application, the requisite transition temperature, the requisite density, and any other requirements imposed by the application as earlier described). The organic silicon precursor is added to the solvent after the dispersing sub-step 200a (sub-step 200b). Exemplary organic silicon precursors include tetraethoxy silane and polycarbosilane among others. The silicon-containing encapsulation layer 18 is formed around the heat sink material 16 from the organic silicon precursor (sub-step 200c) (a particle 14 of the encapsulated heat sink material is depicted in FIG. 1A). The silicon-containing encapsulation layer may be formed by decomposing the chemical bonds in the organic silicon precursor. The chemical bonds may be decomposed (i.e., broken) by heat treatment, a condensation reaction, or other methods as known in the art. For example, the chemical bonds in the organic silicon precursor tetraethoxy silane may be broken by a condensation reaction in a mixed solution of ethanol/ammonia.

The silicon-containing encapsulation layer may be, for example, silicon dioxide, SiC, or the like. The heat-sink material is encapsulated to ensure integration of the encapsulated heat sink material into the fiber-reinforced composite material of the brake disk, while also preventing chemical reaction of the heat sink material with the matrix material. The $SiO_2$ and SiC encapsulated heat-sink materials provide high temperature, at least up to about 1100° C. (2012° F.) containment for the heat sink material, as the melting point of $SiO_2$ is about 1600° C. (2912° F.) and the melting point of SiC is about 2700° C. (4892° F.). The $SiO_2$ and SiC encapsulated heat-sink materials also protect the brake disk material from chemical attack by the heat sink material, while providing high thermal conductivity (e.g., greater than 3-5 $W/cm^{-1}K^{-1}$ in the case of silicon carbide) to the encapsulated heat sink material to work as the integrated heat sink of the brake disk. The high surface area to volume ratio of the micron size or smaller-dispersed heat sink phases facilitate a fast thermal response to mitigate brake disk overheating.

Still referring to FIG. 2, according to various embodiments, the method 10 for manufacturing the brake disk with an integrated heat sink continues by infiltrating the brake disk or its preform with the encapsulated heat sink material in the solvent (step 300). As noted previously, the brake disk may be infiltrated post-processing (i.e., after manufacture of the brake disk but without the integrated heat sink) if the porosity thereof is substantially continuous and accessible.

The method for manufacturing the brake disk with an integrated heat sink continues by removing the solvent (step 400). The solvent may be removed by evaporation or by other methods. The method for manufacturing the brake disk with an integrated heat sink may continue by converting the silicon dioxide encapsulation layer into a silicon carbide encapsulation layer (step 500). Step 500 is optional depending upon the application and process conditions. However, SiC has a higher melting temperature, higher thermal conductivity, and may have better mechanical properties relative to silicon dioxide. The silicon dioxide encapsulation layer may be converted into the silicon carbide encapsulation layer by carburizing the silicon dioxide (silica) encapsulation layer in a reducing hydrocarbon environment. Carburization is the formation of carbides in a material as a result of exposure to a carbon-containing atmosphere. Carburization may be performed by pyrolysis under pyrolysis conditions. The exemplary chemical reaction for carburizing $SiO_2$ to SiC is: $SiO_2+2C \rightarrow SiC+CO_2$. The forming of the silicon-containing encapsulation layer and the carburizing may be performed simultaneously.

The dispersed encapsulated heat sink material will be fixed internally and sealed in the fiber-reinforced composite material of the brake disk upon further matrix infiltration, densification, sealing, or graphitization processing steps. The carbon or ceramic matrix of the brake disk is loaded with the encapsulated heat sink material. The brake disk with an integrated heat sink material may have low density (less than 3 $g/cm^3$) (the heat sink material may have a density of less than 3.5 $g/cm^3$), high thermal stability up to about 2000° C. (3632° F.) for a time duration as needed, high thermal conductivity (1-15 $Wcm^{-1}K^{-1}$), and high strength. Additionally, other important properties for the brake disk with an integrated heat sink as described herein relative to the conventional brake disk include, for example, matched coefficient of thermal expansion, good interfacial adhesion, chemical compatibility with the carbon composite framework, and a negligible impact on the coefficient of friction of the C/C composite brake disk relative to a C/C brake disk without the integrated heat sink.

Brake kinetic energy (BKE) amounts needed to be absorbed by each aircraft brake during typical landing conditions can range up to about $75 \times 10^6$ ft-lb (about 100 MJ). Introduction of such energy may result in corresponding brake temperature increase to about 550° C. to about 600° C. High-speed and hard braking events (e.g., rejected take-offs) can impose much higher energy absorption loads that can reach up to $120 \times 10^6$ ft-lb (about 160 MJ) per brake and brake temperatures reaching up to 1000° C. Exemplary C/C composite brake disks overheat warning temperature limits can range from 300° C. to 550° C. The sensible heat capacity of conventional brake disks is about 0.5 to about 1.30 kJ/kg ° C.

Friction heating of the brake disks with integrated heat sink during their engagement causes the loaded matrix material (i.e., the composite matrix material with encapsulated heat sink) to increase in temperature and the heat sink material to undergo one or more first order transitions (phase transformation by heat transfer) to form higher temperature phases. These transition latent heats are endothermic, enabling matrix storage of excess heat and preventing further temperature increase of the brakes beyond the intended safe material limits. As a result, the brake disks with integrated heat sink are lower in temperature after engagement and cool more quickly to minimum take-off temperatures relative to conventional carbon composite brakes, minimizing aircraft layover times. Additional heat loss occurs by radiation and convection. During cooling, the loaded matrix passes through one or more transitions to form lower temperature phases. These transition latent heats are exothermic, enabling the previously stored heat to be released, warming up the composite brake disks with integrated heat sink. The higher heat load absorption capacity at the same weight allows for lower brake operating temperatures. This in turn allows for shorter brake cool down periods, thus quicker aircraft turn-around between flights and higher equipment utilization. In addition, longer brake life is anticipated due to the reduced oxidation rates at the lower temperatures. In addition to conferring protection to the brake disk against over-heating, the encapsulated heat sink material plugs the intrinsic porosity of the brake disk, protecting the brake disk with integrated heat sink from high temperature oxidation, corrosion, and anti-icing fluid attack during operation.

While aircraft brake disks with integrated heat sink have been described, it is to be understood that brake disks for other vehicles that require thermal management may benefit from various embodiments as described herein. In addition, it is to be understood that various embodiments may provide thermal management functionality and protection in other applications. For example, heat shield structures may benefit from various embodiments as the higher thermal storage capacity allows for increased operating heat loads and lower operating temperatures at the same weight. Energy strike shield structures may benefit as the higher thermal storage capacity allows absorption of larger thermal energy amounts generated from electromagnetic radiation strikes (e.g. laser, microwave, etc.) and lower resulting material temperatures than conventional composite structures at the same weight. Other structures that may benefit from various embodiments include aero-engine components (e.g., exhaust cones, casing struts, nozzle flaps, flame stabilizers, combustion liners, and turbines), hypersonic and space vehicle components and hardware, among others.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for producing an encapsulated heat sink material, the method comprising:
    dispersing particles of a heat sink material in a solvent containing a surfactant to form a dispersion;
    adding an organic silicon precursor to the dispersion, the organic silicon precursor comprising a polycarbosilane; and
    forming a silicon-containing encapsulation layer around the heat sink material from the organic silicon precursor, the silicon-containing encapsulation layer comprising SiC.

2. The method of claim 1, wherein the surfactant comprises at least one of polyvinylpyrrolidone (PVP) polymer, polyvinylalcohol (PVA), polyethylene oxide (PEO), polypropylene oxide (PPO), or acetylenic diol based chemicals.

3. The method of claim 1, wherein the solvent comprises at least one of ethanol, 1-propanol, 2-propanol, 1-butanol, or 2-butanol.

4. The method of claim 1, wherein the encapsulated heat sink material comprises:
    the heat sink material; and
    the silicon-containing encapsulation layer encapsulating the heat sink material.

5. The method of claim 1, wherein the heat sink material comprises at least one of a eutectic salt, a eutectic alloy, or a material with a melting temperature greater than about 300° C. to about 1100° C., a transition temperature greater than about 300° C. and less than about 1100° C., and a density of less than 3.5 g/cm$^3$.

6. The method of claim 1, wherein forming the silicon-containing encapsulation layer comprises decomposing the organic silicon precursor by at least one of a heat treatment or a condensation reaction.

7. A method for manufacturing a brake disk with an integrated heat sink, the method comprising:
    infiltrating the brake disk or preform thereof with encapsulated heat sink material in a solvent, the encapsulated heat sink material comprising a heat sink material encapsulated within a silicon-containing encapsulation layer, the silicon-containing encapsulation layer comprising silicon dioxide;
    converting the silicon dioxide of the silicon-containing encapsulation layer into silicon carbide by carburizing the silicon dioxide; and
    removing the solvent.

8. The method of claim 7, further comprising producing the encapsulated heat sink material by:
    dispersing particles of the heat sink material in the solvent containing a surfactant;
    adding an organic silicon precursor to the solvent after the dispersing; and
    forming the silicon-containing encapsulation layer around the particles of the heat sink material from the organic silicon precursor.

9. The method of claim 8, wherein forming the silicon-containing encapsulation layer is performed prior to infiltrating the brake disk or preform thereof.

10. The method of claim 8, wherein the forming the silicon containing encapsulation layer and the carburizing the silicon dioxide are performed simultaneously.

11. The method of claim 8, wherein converting the silicon dioxide of the silicon-containing encapsulation layer into silicon carbide is performed after removing the solvent.

* * * * *